United States Patent [19]
Westerman et al.

[11] 4,445,467
[45] May 1, 1984

[54] TWO-CYCLE STRATIFIED CHARGE GAS ENGINE

[75] Inventors: Howard G. Westerman, 743 Blue Lake Cir., Richardson, Tex. 75080; Lewis E. Allsopp, Stafford, England

[73] Assignee: Howard Westerman, Richardson, Tex.

[21] Appl. No.: 406,826

[22] Filed: Aug. 10, 1982

[51] Int. Cl.³ .................... F02B 23/00; F02B 75/02
[52] U.S. Cl. .................... 123/65 R; 123/657; 123/661; 123/664; 123/193 P; 123/193 H; 123/670
[58] Field of Search ............... 123/657, 664, 666, 665, 123/661, 663, 65 R, 193 P, 193 H, 670

[56] References Cited
U.S. PATENT DOCUMENTS

| | | | |
|---|---|---|---|
| 1,945,818 | 2/1934 | McPherson et al. | 123/657 X |
| 2,154,358 | 4/1939 | Ross | 123/657 X |
| 2,966,145 | 12/1960 | Froehlich | 123/657 X |
| 3,872,844 | 3/1975 | Gates | 123/90.13 |
| 3,933,143 | 1/1976 | Gurtler | 123/193 P |
| 3,999,532 | 12/1976 | Kornhauser | 123/666 X |
| 4,162,661 | 7/1979 | Nakanishi et al. | 123/193 P X |
| 4,182,279 | 1/1980 | Sato et al. | 123/193 H |
| 4,223,645 | 9/1980 | Nohira et al. | 123/670 X |
| 4,259,933 | 4/1981 | Nakanishi et al. | 123/193 P |
| 4,284,044 | 8/1981 | Nakanishi et al. | 123/661 X |
| 4,291,662 | 9/1981 | Nakamura et al. | 123/661 |
| 4,324,214 | 4/1982 | Garcea | 123/193 P X |
| 4,325,333 | 4/1982 | Kato et al. | 123/661 X |

FOREIGN PATENT DOCUMENTS

| | | | |
|---|---|---|---|
| 380337 | 9/1932 | United Kingdom | 123/666 |
| 2070135 | 9/1981 | United Kingdom | 123/657 |

OTHER PUBLICATIONS

Internal Combustion Engines, E. F. Obert, 2nd Ed., Textbook Co., Scranton, Pa., pp. 7-10, 161, 460-467.
Theory and Design of Stratified Charge Engines, a report by Ricardo & Co., Sussex, England, Oct. 1975, pp. 23-32.

Primary Examiner—Wendell E. Burns
Attorney, Agent, or Firm—Drude Faulconer

[57] ABSTRACT

A two-cycle, gas-powered engine which is capable of operating over a wide range of loads including those (e.g. idle speed) which have previously caused misfirings in known engines of this type. A specially constructed head and piston assembly and a governor-controlled fuel system are incorporated into an otherwise typical two-cycle engine to convert the engine into a stratified charge engine. The head and piston assembly is constructed to provide an ovate-domed, flat-bottomed combustion chamber therebetween when the piston is in a top dead center position in the cylinder. This combustion chamber allows fuel injected in the top of the combustion chamber to mix with air being compressed by the piston to provide a rich stratified charge around the ignition means (e.g. spark plugs) which are also positioned near the top of the chamber. This charge is always rich enough to support rapid ignition and to quickly spread burning to the weaker, exhaust-contaminated mixture present in the lower combustion chamber. Further, a squish area is defined by tapered surfaces on the head and on the piston which has the effect of reducing or breaking the swirl of the weaker mixture in the lower combustion chamber while increasing the swirl (i.e. turbulence) of the stratified charge in the upper section, thereby aiding in maintaining the stratified charge in the uppermost portion of the chamber to insure ignition.

8 Claims, 5 Drawing Figures

TWO-CYCLE STRATIFIED CHARGE GAS ENGINE

DESCRIPTION

1. Technical Field

The present invention relates to engines and more particularly relates to a large, two-cycle stratified charge engine capable of efficiently operating on normally gaseous fuels over a wide range of operating loads.

2. Background Art

Highly reliable, low maintenance, two-cycle engines have long been used to power a variety of equipment in environments where the equipment is left unattended for long periods of time. One such environment exists in the oil industry where engines of this type drive gas compressors, oil field beam pumping units, waterflood pumps, water disposal pumps, and similar equipment in remote locations. A large number of these engines have been adapted to run on fuels which are gaseous at ambient conditions (e.g. natural gas, propane, butane, hereinafter collectively referred to as "gas") and which are usually readily available at such operational sites.

Such large, two-cycle gas-powered engines normally have low compression pressures to avoid "knock" which is aggravated by the long combustion flame travel that is inherent in the large-bore cylinders and the slow speed (i.e. RPMs) of these types of engines. These low compression pressures present a real problem in maintaining proper air-fuel mixtures over the wide range of loads (i.e. idle speed to full load) which are normally encountered during prolonged operation.

Further, since two-cycle, gas-powered engines of this type are designed to give their optimum performance when operating at full load and speed, any load or speed below full load or speed results in exhaust gas contamination of the incoming fuel charge which, in turn, causes misfiring, poor acceleration, high fuel consumption, and high exhaust emissions.

In an attempt to alleviate these problems, low loads on such engine are carried at high air-fuel ratios, with the mixture being progressively enriched as the load increases. However, this technique oftentimes still results in misfiring and poor overall performance whenever the engine experiences extremely light loads (e.g. idle speed). Accordingly, such light loads are either not attempted with a particular engine or the air intake of the engine has to be throttled as is done in other types of conventional spark-ignited engines; this latter approach being an undesirable alternative in two-cycle engines of the type described above.

Although the problems of large two-cycle, gas-powered engines misfiring at light loads and the causes therefor have long been recognized in the art, unfortunately, this problem still exists in many, if not all, of the known engines of this type in use today. For example, one of the most widely used two-cycle, gas-powered engines in the oil industry today is designed to run on unthrottled air with the fuel charge to the engine being controlled by an adjustable injector valve and a governor-regulated valve in the fuel line. In normal operation, the injector valve is manually set to remain open for a defined length of time which allows the governor-regulated valve to provide sufficient fuel to operate the engine over a defined range of expected operating loads. Where the loads on the engine remain in this defined range, sufficient fuel (i.e. gas) is supplied to the engine cylinder to mix with the unthrottled air to provide an adequate combustible mixture in the combustion chamber. However, when the loads (i.e. idle speeds) drop below this range, as they routinely do, the governor-regulated valve responds to restrict gas flow to the injector valve. The resulting air-fuel mixture becomes too lean to be ignited and the engine misfires. This misfiring, in turn, causes the engine speed to drop drastically and the governor-regulated valve immediately responds to substantially increase the gas flow to the engine. The air-fuel mixture now becomes too rich and, when ignited, the mixture instantly detonates instead of burning evenly thereby causing the engine to experience a severe overload. As is recongized in the art, such alternating misfirings and overloadings over extended periods often result in substandard engine performance and in substantially increased maintenance costs and downtime.

Therefore, it can be seen that this type of two-cycle, gas-powered engines need to be modified so that a proper combustible mixture is maintained throughout the operating range of the engine even under loads as light as those encountered at idling speeds.

DISCLOSURE OF THE INVENTION

The present invention provides a two-cycle, gas-powered engine which is capable of efficiently operating over a wide range of loads including those light loads which previously have resulted in misfirings in known engines of this type. In accordance with the present invention, a specially constructed head and piston assembly and a governor-controlled fuel system are incorporated into an otherwise typical, commercially-available two-cycle engine to thereby modify or convert said engine into a stratified charge engine which is capable of maintaining an adequate air-fuel mixture for proper firing even under very light operating loads, e.g. idle speeds.

The head and piston assembly of the present invention is constructed to provide a uniquely-shaped, combustion chamber therebetween when the piston is in a top dead center position in the cylinder. Also, the crown of the piston has a beveled surface on the upper periphery thereof which cooperates with a substantially parallel tapered surface on the head when the piston is at top dead center to define a squish area therebetween from which additional air is squeezed into the combustion chamber just before ignition.

The combustion chamber, itself, is formed of a relatively-elongated "egg-shaped" upper section which is formed in the head and an open, deep flat-bottomed cup-shaped lower section which is formed in upper surface of the piston crown. Both the upper and lower sections have diameters that are substantially less than that of the cylinder bore. The upper section of the combustion chamber is formed of a lower cylindrical portion which merges integrally into an ovate-shaped domed upper portion. The small diameter, deep egg-shaped upper portion in the head coupled with the small diameter, deep flat-bottomed, cup-shaped lower section in the piston provides a combustion chamber effectively as deep as it is wide. This allows a fuel charge supplied by an injector valve in the top of the upper section to mix with the air being compressed by the upward stroke of the piston and to remain in the uppermost portion of the chamber to provide a stratified charge of a rich air-fuel mixture around the ignition means (e.g. spark plugs) which are also positioned near the top of the upper section. By providing such a stratified charge, the air-fuel mixture which surrounds the ignition means is always rich enough to support ignition and to quickly spread the resulting flame to the weaker mixture present in the lower section of the combustion chamber.

Further, the close clearance, squish area in addition to providing additional air into the upper section of the combustion chamber also has the effect of reducing or breaking the swirl of the weaker mixture in the lower section of the combustion chamber while increasing the turbulence, hence mixing, of the richer mixture in the upper section. This results in concentrating and maintaining the stratified charge, i.e. richer mixture, in the uppermost portion of the upper section to insure ignition and a rapid burning of the stratified charge while, at the same time, retaining the weaker mixture in the lower portion of the chamber.

Fuel is regulated through a governor-controlled valve in a positive pressurized feed line to the injector valve which, in turn, is timed to open and close at predetermined angles of crankshaft rotation. More specifically, fuel injection is begun just after the piston begins its upward stroke but before either the air inlet or exhaust ports are closed and is continued until just after these ports are closed. The injector valve always stays open for this define angle of crankshaft rotation. Fuel is supplied to the injector valve through a low pressure feed line having a regulator valve therein that, in turn, is responsive to a governor on the engine to increase or decrease fuel flow to the injector. However, even when the speed of the engine is extremely low due to a light load thereon, sufficient fuel is still supplied through the injector to provide an adequate stratified charge in the combustion chamber of the present invention to insure ignition and prevent misfiring.

BRIEF DESCRIPTION OF THE DRAWINGS

The actual construction, operation, and apparent advantages of the present invention will be better understood by referring to the drawings in which like numerals identify like parts and in which.

BEST MODE FOR CARRYING OUT THE INVENTION

Figure 1:
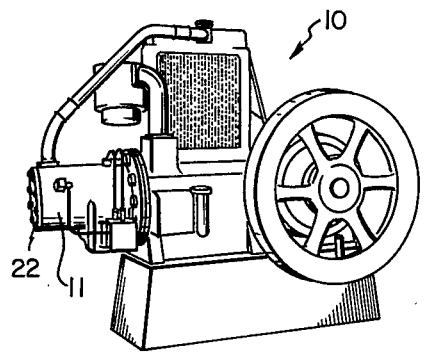
FIG. 1 is a perspective view of a two-cycle engine in accordance with the present invention.

Referring more particularly to the drawings, FIG. 1 is a representative of a typical, commercially-available engine 10 which has been modified in accordance with the present invention. As illustrated, engine 10 is a single cylinder, two-cycle horizontal gas engine of the type commonly used to drive oil field equipment, e.g. Ajax Two-Cycle Horizontal Gas Engine, available from Cooper Energy Services, AJAX PRODUCTS, Corry, PA and disclosed on page 1618 of Composite Catalog of Oil Field Equipment and Services, 33rd revision, 1978-79, published by World Oil, Gulf Publishing Co., Houston, Tex.

Figure 2:
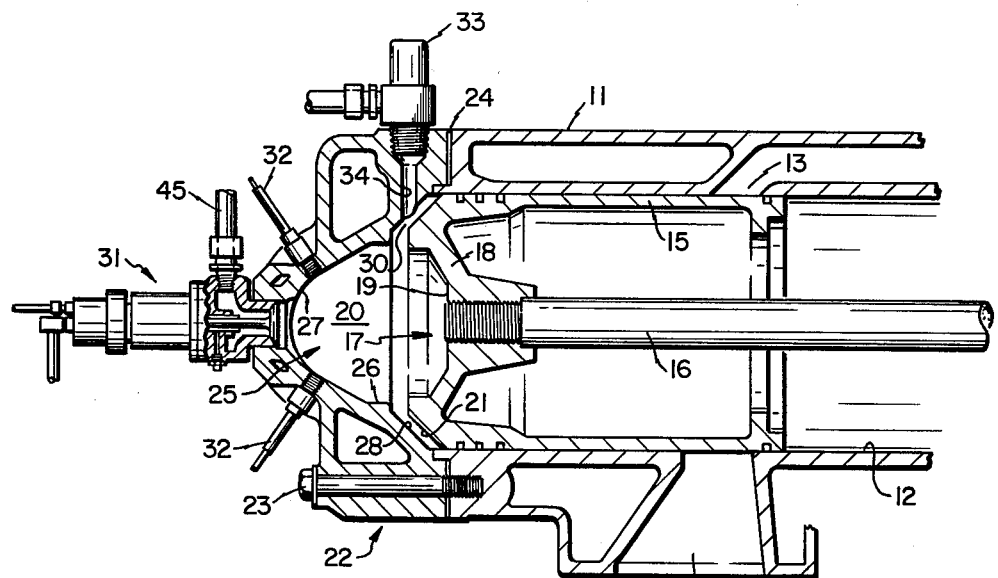
FIG. 2 is a sectional view of the upper end of the engine block of FIG. 1 showing the head and piston assembly of the present invention.

As shown in FIG. 2, engine block 11 of engine 10 is basically the same as that used in typical known two-cycle engines of this type. Block 11 has a cylinder bore 12 formed therein which, in turn, has air inlet port 13 and exhaust port 14 opening into the lower portion thereof. The terms "upper" and "lower" are used throughout as if cylinder bore 12 were in a vertical position with "upper" referring to the direction toward the head and (to the left of FIG. 2) of block 11 and "lower" referring to the direction toward the opposite or crank end (to the right in FIG. 2) of the block.

In accordance with the present invention, a specailly constructed crosshead piston 15 is secured to the end of rod 16 and is slidably mounted within bore 12. A deep, cup-shaped recess 17 having a flat bottom 19 is formed in the crown 18 of piston 15. Recess 17 forms the lower section of combustion chamber 20 when piston 12 is in its top dead center (T.D.C.) position. The diameter of recess 17 is substantially less than the diameter of crown 18 of piston 15 (e.g. recess diameter approximately 55% of crown diameter). A beveled, annular surface 12 is provided around the upper periphery of crown 18 for a purpose described below.

Head 22 of the present invention is mounted on block 11 by means of bolts 23 or the like. Gasket 24 is provided between head 22 and block 11 as will be understood by those skilled in the art. The upper section 25 of combustion chamber 20 is formed in the head 22 and has a lower, cylindrical portion 26 which integrally merges into an upper ovate- or egg-shaped domed portion 27. The diameter of lower cylindrical portion 26 is substantially less than the diameter of bore 12 (e.g. lower portion diameter is equal to approximately 60% of bore diameter). Head 22 has a tapered annular surface 28 thereon which extends from the approximate lower end of upper section 25 of combustion chamber 20 outward towards the lower surface of head 22 at a point adjacent the upper periphery of cylinder bore 12. Tapered surface 28 is substantially parallel to beveled surface 21 on crown 18 and these two surfaces define a low clearance squish area 30 therebetween when piston 15 is in a top dead center position.

Injector valve 31 is mounted in head 22 and extends into the uppermost point of combustion chamber 20. Injector valve 31 may be any injector valve that is capable of supplying a gaseous fuel, e.g. natural gas, into chamber 20 and may be hydraulically, mechanically, or electrically operated. As shown, injector valve 20 is a hydraulically operated valve (operated by hydraulic lines 20a, 20b; see FIG. 3) of the type disclosed and fully described in U. S. Pat. No. 3,872,844, issued Mar. 25, 1975, and incorporated herein by reference.

One of more ignition means (e.g. spark plugs; two shown in FIG. 2) extend through head 22 into the upper section 25 combustion chamber 20 at points as close to the top of the combustion chamber and to injector valve 31 as is practical. As understood in the art, power for ignition means 32 can be provided by any known means, e.g. an electronic capacitor ignition system having a battery supply and/or generator; a low tension pulse type magneto; or by any equivalent system. As is common in engines of this type, a fitting 33 cooperates with passage 34 in head 22 to supply high pressure air or gas from a source (not shown) for starting the engine 10.

Figure 3:
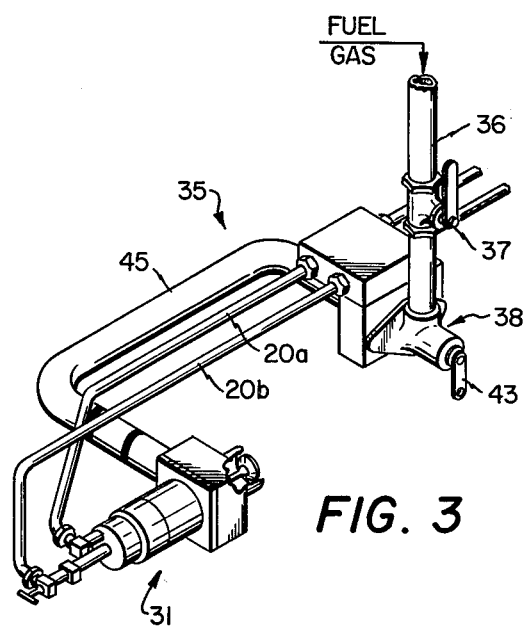
FIG. 3 is a perspective view, partly in section, of the fuel system of the present invention.
Figure 4:
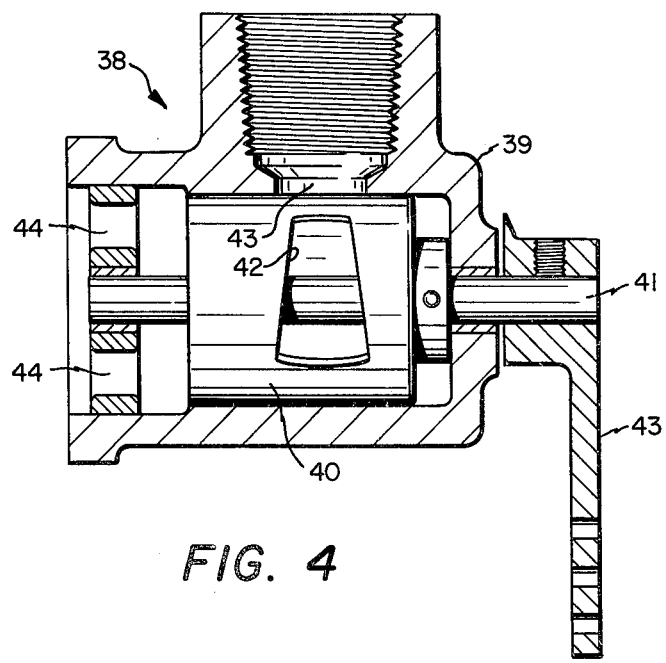
FIG. 4 is an enlarged, partly in section, view of the fuel regulator valve used in the fuel supply system of FIG. 3.

The fuel supply sytem 35 of the present invention is illustrated in FIGS. 3 and 4. Fuel, e.g. natural gas, is fed at an approximate pressure of 12 psi through an on-off valve 37 in line 36 to fuel regulator valve 38. Valve 38

Figure 5:
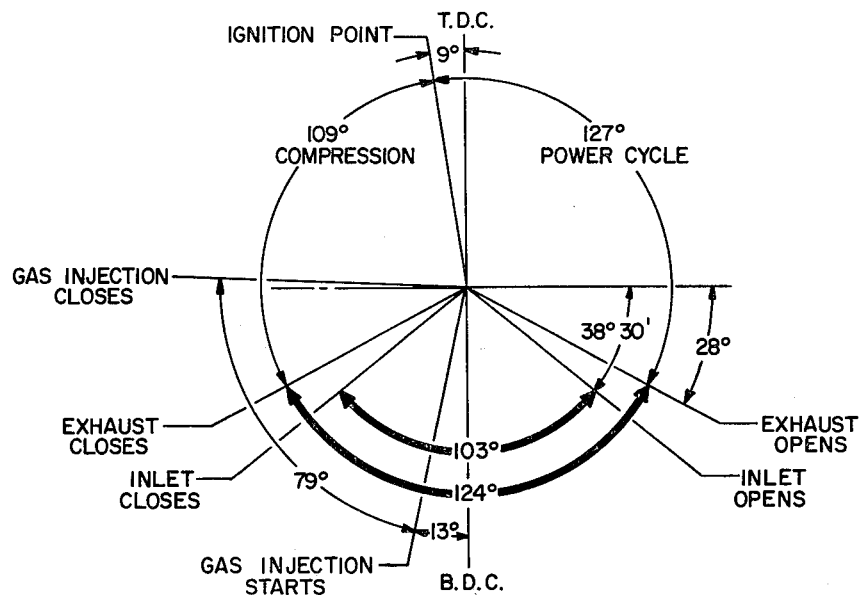
FIG. 5 is a timing diagram for the engine of FIG. 1.

(FIGS. 4 and 5) is comprised of housing 39 having a core 40 rotatably mounted therein by means of shaft 41. Core 40 has an opening 42 therein which cooperates with inlet 43 in housing 39 to regulate fuel flow through valve 38. As shown in FIG. 4, opening 42 is tapered to permit very sensitive fuel control upon only slight rotation of core 40 within housing 39. Arm 34 is affixed at its upper end to the outer end of shaft 41 and is adapted to be connected at its lower end by linkage or the like (not shown) to a governor (not shown) on engine 10. It can be seen that fuel will flow through inlet 43, opening 42, and out outlets 44 of valve 39 into fuel supply line 45 to injector valve 31 in head 22 and that the amount of fuel is regulated by rotation of core 40 within valve 38 in response to the engine governor which, in turn, senses changes in engine speeds as is known in the art.

In operation, engine 10 is started with high pressure air or gas through passage 34 as is known in the art. Piston 15 moves downward in bore 12 and as it uncovers exhaust port 14, most of the products in the cylinder will escape therethrough into the atmosphere or into an exhaust manifold (not shown). Immediately afterwards, piston 15 begins to uncover air intake port 13 and scavenge and/or induction air is pumped therethrough into bore 12 to "loop" scavenge the exhaust gases from bore 12 as will be understood by those skilled in the art. After piston 15 uncovers both inlet port 13 and exhaust port 14, it reaches bottom dead center (B.D.C.) (not shown). Piston 15 then begins its upward stroke in bore 12 and closes air inlet port 12 and exhaust port 14 as it moves upward past same. The air in bore 12 and any remaining exhaust gases are then compressed by the continued upward movement of piston 15.

Fuel is injected into the uppermost part of combustion chamber 20 through injector valve 31 which is timed to open and close at a pre-determined angle of crankshaft rotation. As can be seen from the timing diagram in FIG. 5, injector valve 31 is opened just after piston 15 begins its upward stroke and injection of fuel, e.g. gas, is started while both air inlet port 13 and exhaust port 14 are open. Gas injection is continued until after both inlet port 12 and exhaust port 14 are closed. This timing is such that injector valve 31 is closed before the scaveneged air in bore 12 is compressed sufficiently to match the injected gas supply feed pressure. As piston 15 moves top dead center (T.D.C.), see FIG. 2, beveled surface 21 on crown 18 approaches tapered surface 28 on head 22 to "squish" additional air into the upper section 25 of combustion chamber 20 to mix with the fuel from injector valve 31.

The small diameter, deep egg-shaped upper section 25 in head 22 coupled with the deep, flat-bottom cup-shaped lower section 17 in crown 18 has the beneficial effect of making combustion chamber 20 as deep as it is wide. This allows chamber 20 to contain and retain a relatively rich mixutre in upper section 25 while the exhaust-contaminated weaker gas/air mixture is contained primarily in the lower section 17 thereof. It is noted that the flat bottom 19 of recess 17 prevents uniform swirling of gases therein which aids in keeping exhaust-contaminated gases from flowing into upper section 25.

Further, the close clearance squish area 30 has the effect of further reducing or breaking the swirling of the exhaust-contaminated mixture in lower section 17 of chamber 20 while, at the same time, beneficially increasing the swirl (i.e. turbulence and mixing) in upper section 25. Accordingly, squish area 30 provides an effective barrier between the upper and lower sections of chamber 20 which serves to substantially segregate the rich, stratified charge in the upper section 25 from the weak, exhaust-contaminated mixture in lower section 17.

Thus, the mixture at spark ignition means 32 is always rich enough to support rapid burning upon ignition and to spread the flame quickly to burn the weaker mixture in the lower section 17. This stratified charge effect allows the gas-powered, unthrottled air engine 10 to operate at partial or light loads (e.g. idle speeds) without experiencing misfirings or the detonation which results in overloading. Also, higher than normal compression ratios can be incorporated into the stratified charge engine 10 and due to the improved performance over the wide range of operating loads, both the fuel consumption and undesirable exhaust emissions will be lower.

What is claimed is:

1. A two-cycle, stratified charge unthrottled air, gas-powered engine comprising:
    an engine block;
    at least one cylinder bore in said engine block;
    a piston slidably mounted in said cylinder bore having a crown thereon;
    a cup-shaped, flat-bottomed recess formed in said crown having a diameter substantially less than the diameter of said crown;
    a head mounted on said engine block; and
    a deep, ovate-shaped chamber formed in said head; said chamber having a diameter substantially less than the diameter of said cylinder bore whereby said recess and said chamber cooperate to form a combustion chamber therebetween when said piston is at top dead center in said cylinder bore wherein said combustion chamber is substantially as long as it is wide.

2. The engine of claim 1 including:
    a beveled surface on the upper periphery of said crown; and
    a tapered surface on said head substantially parallel to said beveled surface and extending outwardly from the bottom periphery of said chamber in said head to a point adjacent the periphery of said cylinder bore; said beveled and tapered surfaces defining a low clearance squish area therebetween when said piston is at top dead center in said cylinder bore.

3. The engine of claim 2 wherein said deep, ovate-shaped chamber comprises:
    a lower cylindrical portion; and
    an integral upper ovate shaped, domed portion.

4. The engine of claim 3 including:
    a means for injecting gaseous fuel into the uppermost point in said deep, ovate-shaped chamber; and
    ignition means for igniting said gaseous fuel positioned in said ovate-shaped chamber as near to said uppermost point as is practical.

5. The engine of claim 4 wherein said ignition means comprises:
    at least one spark plug.

6. The engine of claim 4 wherein said means for injecting gaseous fuel comprises:
    an injector valve mounted through said head and opening into said ovate-shaped chamber at said uppermost point; said injector valve having a fuel supply line connected thereto; and a regulator valve in said fuel supply line, said regulator valve adapted to be responsive to a governor on said engine to regulate fuel flow therethrough.

7. The engine of claim 6 wherein said regulator valve comprises:
   a housing having an inlet and an outlet;
   a core rotatably mounted in said housing;
   a tapered opening in said core which cooperates with said inlet in said housing to regulate fuel flow through said regulator valve in response to rotation of said core; and
   means for rotating said core adapted to be connected to an engine governor.

8. A head for a two-cycle, stratified charge, unthrottled air, gas-powered engine comprising:
   a head adapted to be mounted on an engine block to close a cylinder bore therein;
   a deep, ovate-shaped combustion chamber formed in said head at a position wherein said chamber will open into said cylinder bore when said head is in an operable position on said block, said combustion chamber having a diameter substantially less than the diameter of said cylinder bore and having a lower cylindrical portion and an integral upper ovate-shaped domed portion;
   a tapered surface on said head extending downwardly and outwardly from the bottom periphery of said lower cylindrical portion of said ovate-shaped chamber to a point adjacent the periphery of said cylinder bore when said head is in an operable position on said block;
   means on said head for mounting an injector valve into the uppermost point of said upper ovate-shaped domed portion of said chamber at a position as near to said uppermost point as is practical, and
   means on said head for mounting ignition means into said upper ovate-shaped domed portion of said chamber at a point as near said uppermost point as is practical.

* * * * *